US008677442B2

(12) United States Patent
Colmagro et al.

(10) Patent No.: US 8,677,442 B2
(45) Date of Patent: Mar. 18, 2014

(54) METHOD OF SENDING A COMMAND TO A DIGITAL DATA FLOW SERVER AND APPARATUS USED TO IMPLEMENT SAID METHOD

(75) Inventors: Jean-Claude Colmagro, Mouaze (FR); Benoit Mercier, Noyal sur Vilaine (FR); Thierry Quere, Monfort sur Meu (FR)

(73) Assignee: Thomson Licensing, Issy les Moulineaux (FR)

( * ) Notice: Subject to any disclaimer, the term of this patent is extended or adjusted under 35 U.S.C. 154(b) by 379 days.

(21) Appl. No.: 11/886,819

(22) PCT Filed: Mar. 22, 2006

(86) PCT No.: PCT/EP2006/060956
§ 371 (c)(1),
(2), (4) Date: Dec. 9, 2008

(87) PCT Pub. No.: WO2006/100268
PCT Pub. Date: Sep. 28, 2006

(65) Prior Publication Data
US 2009/0217328 A1 Aug. 27, 2009

(30) Foreign Application Priority Data
Mar. 25, 2005 (FR) .................................... 05 03011

(51) Int. Cl.
| *H04N 7/173* | (2011.01) |
| *H04N 7/16* | (2011.01) |
| *H04N 5/932* | (2006.01) |
| *H04N 5/935* | (2006.01) |

(52) U.S. Cl.
USPC ........... 725/131; 725/132; 725/139; 725/151; 386/201; 386/202; 386/203

(58) Field of Classification Search
USPC ...................................................... 725/74–135
See application file for complete search history.

(56) References Cited

U.S. PATENT DOCUMENTS

| 5,898,695 | A  | * | 4/1999  | Fujii et al. ...................... 370/464 |
| 6,275,990 | B1 | * | 8/2001  | Dapper et al. ................. 725/106 |
| 6,388,669 | B2 | * | 5/2002  | Minami et al. ................. 345/474 |
| 6,802,074 | B1 | * | 10/2004 | Mitsui et al. .................... 725/25 |
| 7,512,962 | B2 | * | 3/2009  | Gotoh et al. .................... 725/37 |

(Continued)

FOREIGN PATENT DOCUMENTS

| EP | 1439700 | 7/2004 |
| WO | WO 03/010970 | 2/2003 |

OTHER PUBLICATIONS

ISO/IEC 13818-6:1998, Extensions for DSM-CC, Sep. 1, 1998, XP-002366278, pp. 137-139.*

(Continued)

*Primary Examiner* — Mushfikh Alam
(74) *Attorney, Agent, or Firm* — Robert D. Shedd; Jeffrey M. Navon

(57) ABSTRACT

The invention relates to a method of sending commands to a VOD server, e.g. using RTSP, which is local to the client, said commands comprising a reference to the relative current position. The current relative position is maintained by the receiver on the basis of PTS received in the MPEG stream, without sending a request to the server or relying on the existence of a descriptor in the stream that can be used to deal with jumps in PTS included in the stream.

4 Claims, 8 Drawing Sheets

(56) References Cited

U.S. PATENT DOCUMENTS

| | | | |
|---|---|---|---|
| 7,530,084 B2* | 5/2009 | Dawson | 725/25 |
| 2002/0138846 A1* | 9/2002 | Mizutani et al. | 725/93 |
| 2003/0066094 A1* | 4/2003 | van der Schaar et al. | 725/151 |
| 2004/0088741 A1* | 5/2004 | Tsai et al. | 725/135 |
| 2004/0103430 A1* | 5/2004 | Lee et al. | 725/32 |
| 2004/0128701 A1* | 7/2004 | Kaneko et al. | 725/136 |
| 2004/0199658 A1* | 10/2004 | Darshan et al. | 709/232 |
| 2004/0233938 A1* | 11/2004 | Yamauchi | 370/537 |
| 2005/0120377 A1* | 6/2005 | Carlucci et al. | 725/90 |
| 2005/0238316 A1* | 10/2005 | MacDonald Boyce et al. | 386/46 |
| 2006/0173870 A1* | 8/2006 | Erdmenger et al. | 707/100 |
| 2006/0248559 A1* | 11/2006 | Michener et al. | 725/67 |
| 2007/0124782 A1* | 5/2007 | Hirai et al. | 725/105 |
| 2008/0184316 A1* | 7/2008 | Mori et al. | 725/62 |
| 2011/0214155 A1* | 9/2011 | Chen et al. | 725/93 |

OTHER PUBLICATIONS

"ISO/IEC IS 13818-6:1998, Extensions for DSM-CC", ISO/IEC, Sep. 1, 1998, pp. 137-139; XP002366278.

"ISO/IEC IS 13818-6:1998, Extensions for DSM-CC", ISO/IEC, Sep. 1, 1998, pp. 280-281, XP002366279.

"ISO/IEC JCT1/SC29/WG11/N5270: Corrected text of ITU-T Rec. H.222.0 ISO/IEC 13818-1:2000/FDAM 1: carriage of metadata" ISO/IESC, Jan. 2003, pp. 1-23, XP002361915.

Search Report Dated May 15, 2007.

\* cited by examiner

METHOD OF SENDING A COMMAND TO A DIGITAL DATA FLOW SERVER AND APPARATUS USED TO IMPLEMENT SAID METHOD

This application claims the benefit, under 35 U.S.C. §365 of International Application PCT/EP2006/060956, filed Mar. 22, 2006, which was published in accordance with PCT Article 21(2) on Sep. 28, 2006 in French and which claims the benefit of French patent application No. 0503011, filed Mar. 25, 2005.

The present invention relates to the field of the control by a receiver of a content on demand server. More particularly in the case where the server "broadcasts" its content in the form of a flow of digital data via an IP network.

The IETF (Internet Engineering Task Force) has defined, particularly in the RFC (Request For Comment) 2326, a control protocol of digital data flow servers. This protocol, called RTSP (Real Time Streaming Protocol), is used to control a server, open a session, request the start up of a program, its temporary stop, start or definitive stop.

It is therefore possible, using RTSP, to implement special recovery modes of the programmes ("Trick Modes"). These modes are used to supply the commands to which the users are familiar with on a video recorder, for viewing programmes broadcast on IP. It can be cited in these modes fast forward and rewind, as well as the positioning at points previously identified in the programme.

Most RTSP commands, notably the "Play" command involved in the specific recovery modes, require a parameter giving the time stamp of the programme range that is required to be identified by an interval between a start reference and an end reference. The RTSP client must therefore be capable of knowing precisely the current temporal location in the file played. There are several approaches allowing the client to know at each moment the relative current temporal position in the programme. Some servers, for example the Oracle servers, send time descriptors mixed with the programme, but all the servers do not use this mechanism. Another way of doing this involves the client using the RTSP command "GET_PARAMETER" to obtain the current time stamp from the server. This solution requires the time for sending the request and the return of the answer. Nevertheless, this the most commonly used method.

The MPEG standard, referenced "MPEG-2 System: ISO/IEC, 1994. Generic Coding of Moving Pictures and Associated Audio: Systems, (MPEG-2 Systems Specification), November, ISO/IEC 13818-1" describes the way to multiplex multimedia content with a view to its recovery and transport. A programme is separated into elementary streams, the elementary stream being cut into data packets.

In such a manner as to enable the recover of the content, each entity at the level of the elementary streams, for instance a picture for a video stream is assigned a time stamp, called PTS (Presentation Time Stamp). This time stamp shows the moment at which the associated entity, here the picture must be restored. The base of this time stamp being the reference clock of the system, a 90 kHz clock. These are the time stamps that are used to synchronise the various elementary streams constituting the programme between each other.

The succession of these presentation time stamps in the stream of the programme is generally not continuous from the start of the programme to the end. Indeed, a programme can be the result of the assembling of several sequences having been encoded separately and of which the presentation time stamps have not been calculated in the same time reference system. Moreover, during the use of the special recovery modes, a current technique consists in using versions encoded differently for different modes. For example, the server will have a version of the programme encoded in double speed, which it will use if it receives a fast forward command. Here again the different versions of the programmes will have presentation time stamps corresponding to different time reference systems. The presentation time stamps present in the streams thus generally form a succession of sequences each one of these sequences corresponding to a specific time reference system.

It therefore involves finding a reliable method of relative time identification within the programme broadcast applicable by the RTSP client. This method not relying on the use of the descriptors that are not always present in the flows diffused, not requiring any request to the servers and allowing the changes in the time reference system of the presentation time stamp sequences to be dealt with.

The invention proposes a local method to the command send client to a VOD server, for example according to RTSP, these commands comprise a reference to the relative current position. This relative current position is maintained by the receiver on the basis of the PTS received in the MPEG flows, without calling on a request to the server nor based on the existence in the stream of a descriptor able to deal with the breaks in sequences in the PTSs included in the stream. The invention also relates to the client suitable for implementing the method.

The invention relates to a method of sending orders to a digital data stream server by a receiver, the digital stream being broadcast by the server to the receiver via a link connecting the server and the receiver, the flow of digital data comprising at least one programme designed to be recovered at a given speed and time stamps associated with the data of the flow, these time stamps being relative at the moment of recovering the associated data in a time reference system, these time reference systems following each other sequentially in the flow, time reference system changes causing sequence breaks, being able to appear in the stream, comprising at least the following stages:
the reception of the said digital data stream,
sending a command containing the current relative temporal position in the programme contained in the stream, characterised in that this position is determined locally by the receiver, the only information from the stream intervening in the determination of this position being the time stamps associated with the data of the stream.

According to one particular embodiment of the invention this also comprises a regular update step of the current value of the current relative time position.

According to a particular embodiment of the invention the update step comprises a sub-step for determining a Delta value corresponding to the difference between a new time stamp received and the last time stamp stored.

According to one particular embodiment of the invention, the update step also comprises a sub-step for comparing the Delta value and a threshold depending on the stream recovery speed, the presence of a sequence break being determined by a Delta value greater than the threshold.

According to one particular embodiment of the invention, the update step also comprises the addition, in the case of no sequence break of the Delta value to the current value of the time position maintained.

According to one particular embodiment of the invention, the update step also comprises the addition, in the case of no sequence break of the Delta value multiplied by the recovery speed at the current value of the time position maintained.

The invention relates to a digital data stream receiver, the digital stream being broadcast by the server to the receiver via a link connecting the server and the receiver, the flow of digital data comprising at least one programme designed to be recovered at a given speed and time stamps associated with the data of the flow, these time stamps being relative at the moment of recovering the associated data in a time reference system, these time stamps following each other sequentially in the flow, time reference system changes causing sequence breaks, being able to appear in the stream, comprising at least the following stages:
the reception means of the said digital data stream,
a means of sending a command containing the current relative temporal position in the programme contained in the stream, characterised in that it also contains a means for determining this position locally by the receiver, the only information from the stream intervening in the determination of this position being the time stamps associated with the data of the stream.

According to one particular embodiment of the invention this also comprises regular update means of the current value of the current relative time position.

According to one particular embodiment of the invention the update means comprises means for determining a Delta value corresponding to the difference between a new time stamp received and the last time stamp stored.

According to one particular embodiment of the invention, the update means also comprises means for comparing the Delta value and a threshold depending on the stream recovery speed, the presence of a sequence break being determined by a Delta value greater than the threshold.

According to one particular embodiment of the invention, the update means also comprises addition means, in the case of no sequence break, the Delta value to the current value of the time position maintained.

According to one particular embodiment of the invention, the update means also comprises addition means, in the case of no sequence break, the Delta value multiplied by the recovery speed at the current value of the time position maintained.

The invention will be better understood, and other specific features and advantages will emerge from reading the following description, the description making reference to the annexed drawings wherein.

An embodiment of the invention will now be described.

Figure 1:
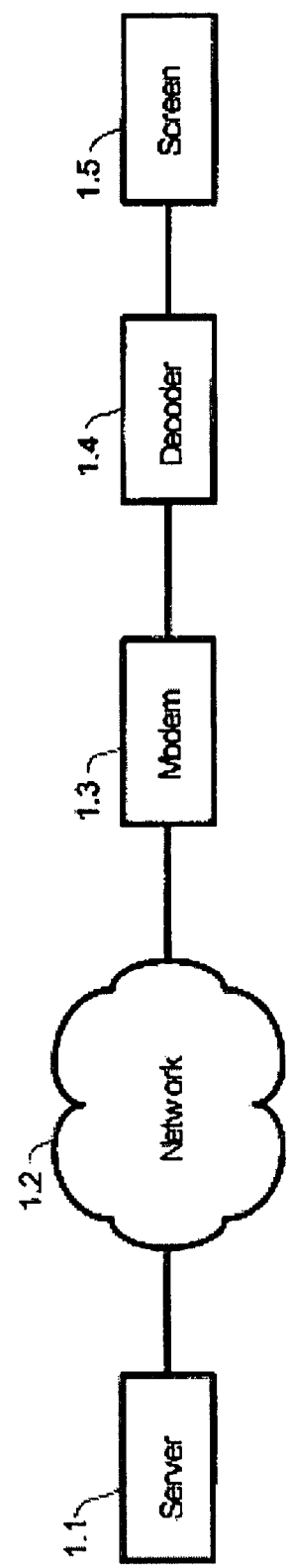
FIG. 1 shows the know architecture of a VOD service (Video On Demand).

This embodiment of the invention falls within the context of video on demand service system (VOD). The general architecture of such a system is described in FIG. 1. The system comprises on or more servers, referenced 1.1. These servers store the programmes to broadcast and can send them in the form of data streams. The users of the system, typically individual subscribers to the services will have at their home a service display screen, referenced 1.5, a decoder 1.4, typically an MPEG enabling the decoding of the digital data stream received in analogue signals sent to the screen. In the context described here, the decoder is an IP decoder suitable for receiving programmes via an IP network, referenced 1.2. The modem, referenced 1.3 is used to connect the network of the user to the IP distribution network 1.2 which can be Internet or the private IP distribution network of the video on demand service provider. In such a system, the decoder will be the RTSP client that controls the broadcast of the programme by the server via the RTSP protocol in answer to the requests of the user.

The MPEG standard defines the manner of encoding and multiplexing the different elementary streams composing a multimedia programme. This programme, typically a video audio programme, is composed of different elementary streams. One generally finds one video stream and one or more audio streams. Each elementary stream includes entities, called presentation units in the standard. Each of these entities is assigned a presentation time stamp known as PTS giving in the time reference system of the encoder, that is according to its clock system, the moment at which this entity or presentation unit must be recovered by the decoder. It is the presence of these presentation time stamps that enable, among other things, the different elementary streams to be synchronised when the decoder recovers the programme. In the case of video, the entity or presentation unit will typically be the picture, whereas it will be a sample in the case of audio.

Figure 2:
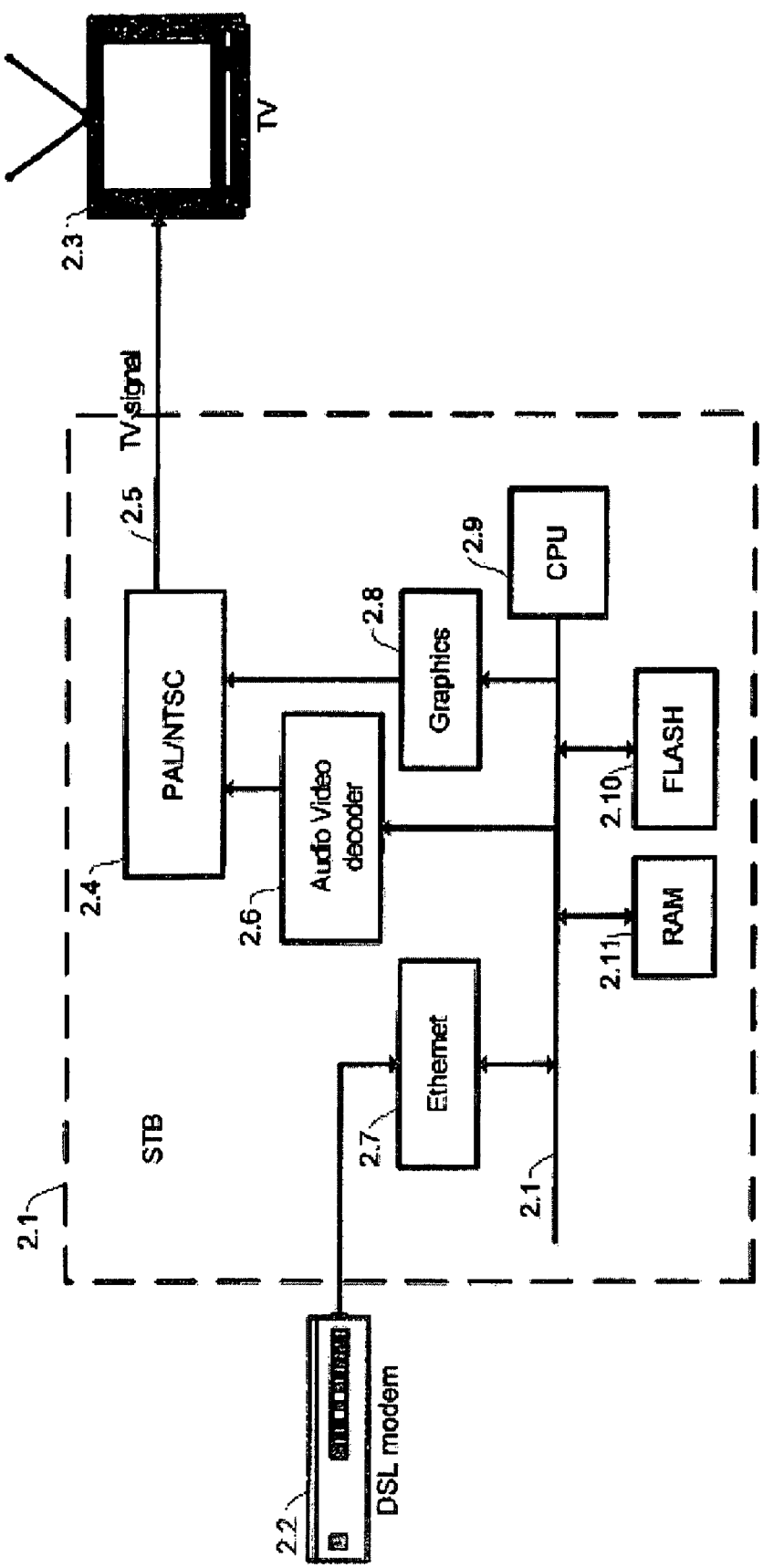
FIG. 2 shows the hardware architecture of the embodiment of the IP decoder.

FIG. 2 describes the hardware architecture of the MPEG decoder of the embodiment of the invention. This decoder, referenced 2.1, is connected to the modem, referenced 2.2, via an Ethernet interface, referenced 2.7. It supplies the TV referenced 2.5 with the analogue signals from the decoding of the programmes. The decoder operates under the control of a central processor, referenced 2.9. This processor runs the programmes stored in a Flash memory referenced 2.10 by using the RAM, referenced 2.11 as the working memory. The MPEG stream is received via the modem 2.2 and the Ethernet interface 2.7, it is then sent to the audio and video decoder 2.6, this decoder separated the different elementary streams and decodes them if they are encoded as well as decompressing them. The decompressed elementary audio and video streams are then sent to a digital to analogue converter, referenced 2.4. A graphics processor referenced 2.8 is responsible for generating graphics that are overlaid on the video pictures, these are typically user interface graphics or programme guide data or other. The digital to analogue conversion module 2.4 produces the analogue signals containing the programmes and the graphics. These signals will be sent to the programme recovery device, typically a television set referenced 2.3.

Figure 3:
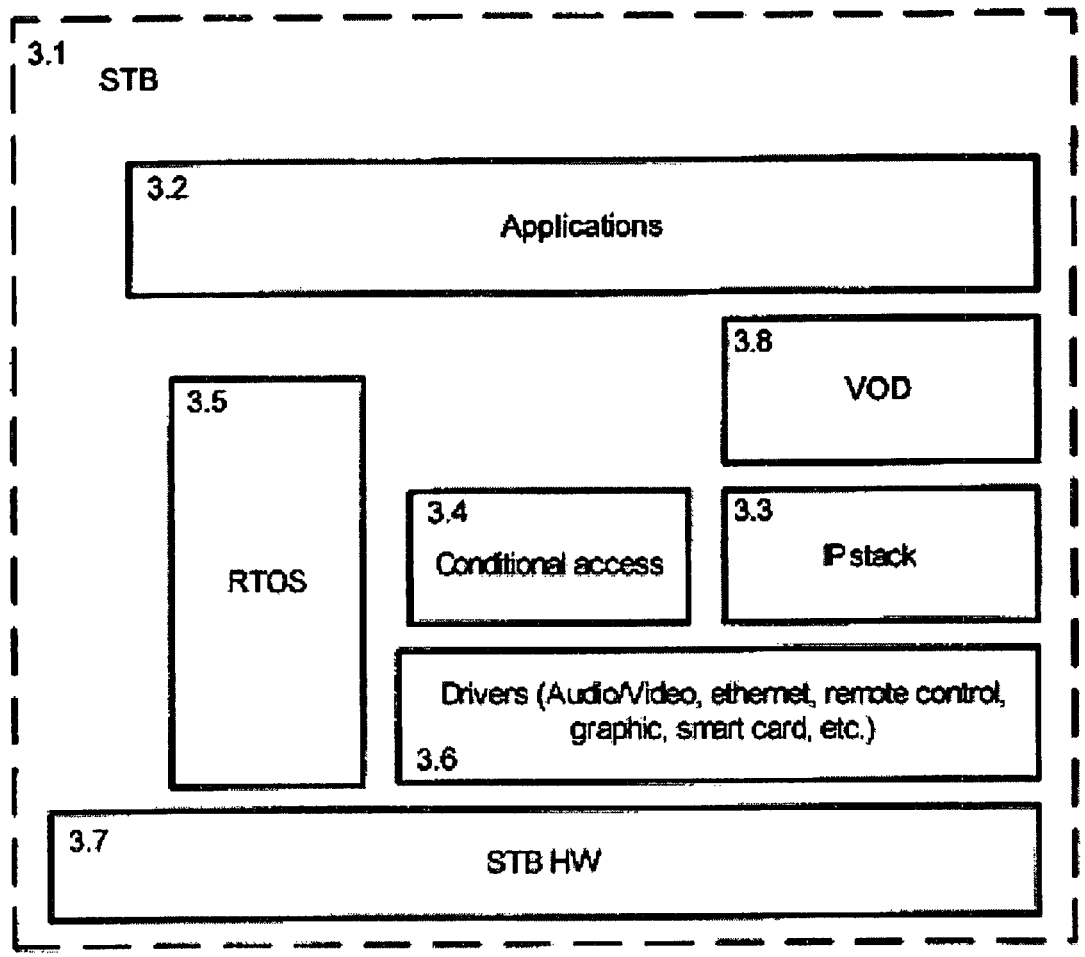
FIG. 3 shows the software architecture of the embodiment of the IP decoder.

FIG. 3 shows a diagram of the software architecture implemented on such a decoder according to the embodiment of the invention. It contains a layer of drivers referenced 3.6 being used to control the hardware referenced 3.7. A Real Time Operating System (RTOS) provides the basic operation of the device. Generally, a conditional access module referenced 3.4 will be responsible for ensuring that the user has the rights enabling the programmes to be viewed. To manage the communications and particularly the reception of the programmes, and IP communication stack, referenced 3.3, dialogues with the network including the video on demand server. The management of the access to the video on demand service dedicated to a VOD module, referenced 3.8, laid above IP and which will manage the dialogue with the VO server, it is within this module that the implementation means of the invention according to the embodiment described are located. At the highest level, a set of applications referenced 3.2 are found enabling the user to be offered a set of services among which, a programme choice interface and often a programme guide.

Figure 4:
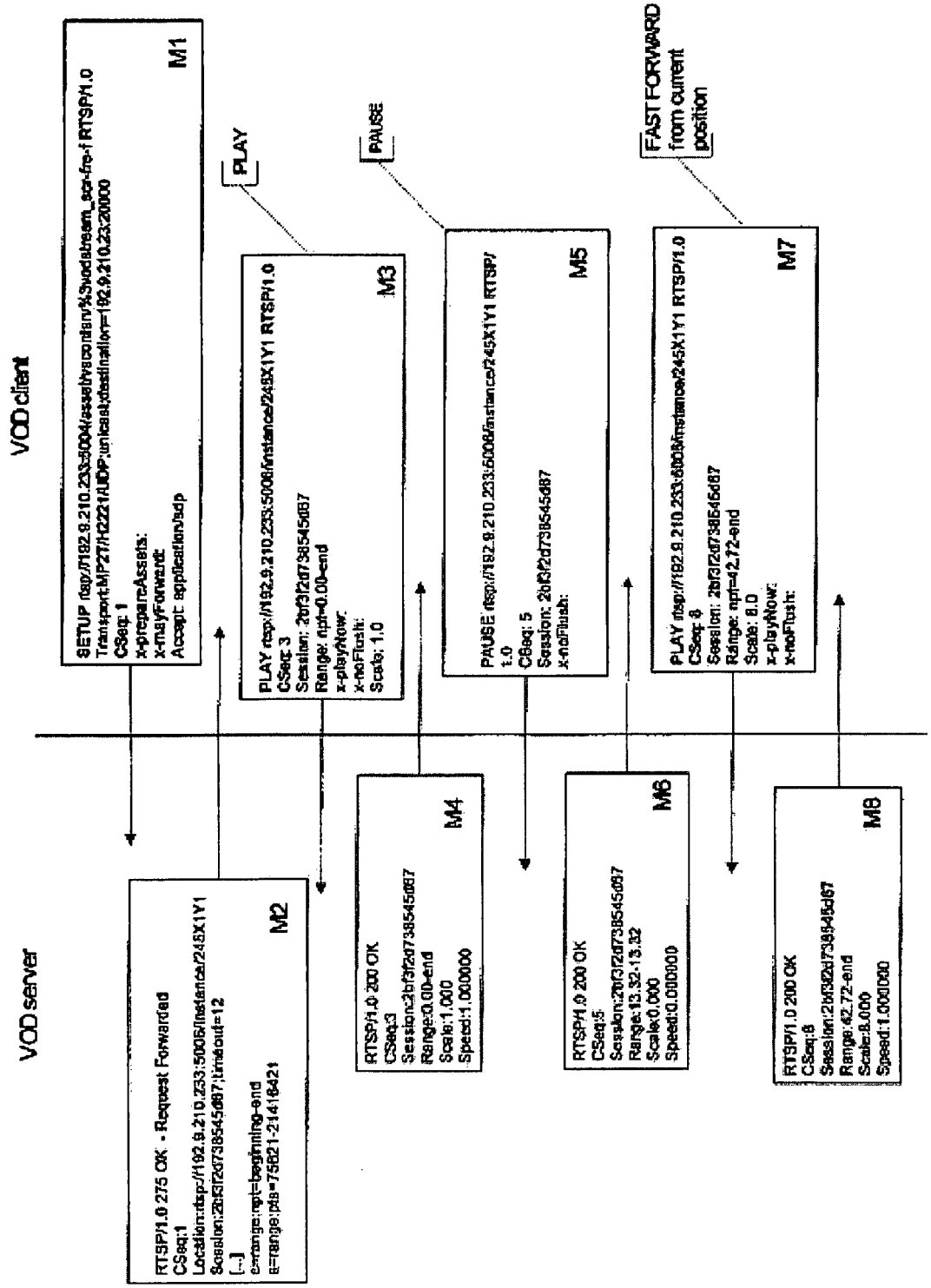
FIG. 4 shows an example of RTSP dialogue between an client and a server.

FIG. 4 represents an example of a dialogue between the client and the VOD server using the RTSP protocol according to the embodiment of the invention. RTSP is a server client protocol enabling the management of the commands of a real time broadcast server of programmes. This protocol only manages the commands, it does not take into account the sending of data, which is done by other protocols. RTSP is generally coupled with the sending of data according to the RAP (Real time Transport Protocol) described in RFC 1889. But the server is free to use any protocol it chooses to send data. One can, for instance, send data directly on UP (User Datagram Protocol, RFC 768), a protocol on which RAP is based.

RTSP, gives the client the possibility of opening a session on the server via the "SETUP" command. This session defines the programme requested, the destination, the transport mode as well as various other parameters. It then enables the server to be asked to send data for a programme range, by specifying the recovery speed, "PLAY" command. It is also possible to ask the server to pause in sending data, "PAUSE" command. The end of the session occurs with a "TEARDOWN" command. The full description of this protocol is referenced in RFC 2326.

In the example of FIG. 4, the VOD client, therefore the decoder, initialises a session through an M1 message containing the "SETUP" command. This command specifies that the client wants the programme whose address is rtsp://192.9.210.233:5004/asset/vscontsrv%3vodstream_scr-free-f by using the version 1.0 of the RTSP protocol in nicest mode via the UP protocol to the address 192.9.210.23 on the port 20000.

The server will respond by the M2 acceptance message. We see here that the server sends an "a=range:pts=75621-2146421" argument, this argument specifies that the programme sent contains presentation time stamps starting at the value 75621 and finishing at the value 2146421. This information can be used by the client to subsequently be located temporally in the programme. Indeed, a presentation time stamp received must enable the associated programme entity to be located in relation to these limits that are called "PTS_start" and "PTS_end". We will see that unfortunately, all the servers do not send this argument and that even when it is available, the time stamps in the programme broadcast are not always calculated in the same reference system as this interval returned in acceptance of the "SETUP".

The client is then able to request the server to begin sending the programme by sending the M3 message containing a "PLAY" command. The "PLAY" must contain an indication of the programme range that one wants to receive. This range can be the entire programme, this is the case here, which is indicated by the argument "Range: npt=0.00-end". There are several ways of indicating a programme range, several ways of indicating the time, the example uses NPT notation (Normal Play Time), which indicates the time position in the stream relatively to the programme start in the form of a decimal fraction. The left-hand part of the fraction gives the time in seconds or hours, minutes and seconds, whereas the right-hand part measures fractions of seconds. The M3 message therefore requests the broadcast of the entire programme from its beginning "0.00" to the "end".

The M4 message is an acceptance of the message M3.

A little later, during the broadcast, the customer requests a pause via the message M5. This pause is accepted via the message M6.

As for the message M7, it is a message that requests a fast forward at 8 times the normal speed from the current point of the programme. The argument of the range used is therefore "Range: npt=42.72-end" and the speed of play is passed via the argument "Scale: 8.0". The M8 message is an acceptance of the message M7.

The aforementioned communication example shows us the importance of temporal location in the stream broadcast for the decoder. Indeed, for example when the decoder requests a move to fast forward at the speed 8 as in the message M7, it must give the start point of the range requested. This start point must correspond exactly to the current point of the programme broadcast so that the user does not notice any jump when changing mode.

Figure 5:
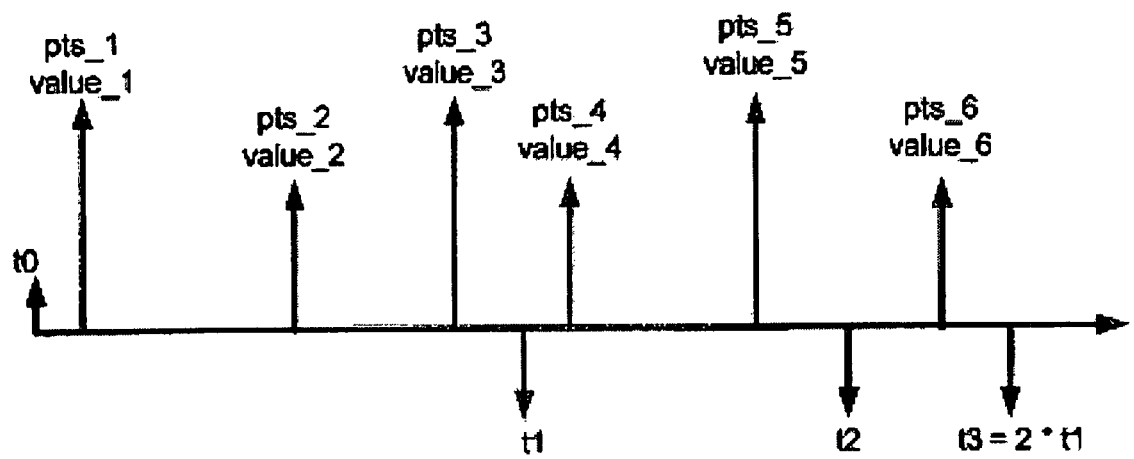
FIG. 5 shows a diagram of the pictures received during a recovery at normal speed with the associated PTS values.

There are different means for the decoder to know the current time position in the stream. The example illustrates that the server, when it acknowledges the "SETUP" command gives the limits of the presentation time stamps used in the stream broadcast. These limits are called PTS_Start and PTS_End. However, the broadcast MPEG stream contains presentation time stamps associated with the images of the programme as illustrated in FIG. 5. In this figure each arrow represents a picture received during the broadcast of a programme with the associated presentation time stamp value. The broadcast starting at time T0, the first picture received will be associated with the PTS_1 having the value value_1. The second picture received will be associated with the PTS_2 having the value value_2 and so on. Logically, the value value_1 corresponds to PTS_Start. In this diagram, it is possible to locate oneself in time with respect to the start of the programme according to the last presentation time stamp received, it is enough to subtract from this last PTS value, the stored value of PTS_Start to know the current relative time with respect to the start of the programme. This time will be known at the precision of the 90 kHz clock used to generate the PTS.

Figure 6:
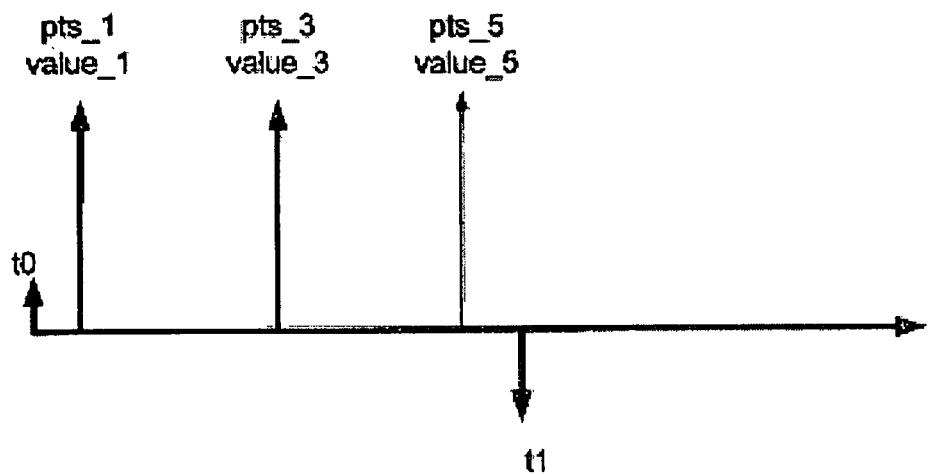
FIG. 6 shows a diagram of the pictures received and the associated PTS for fast forward.

FIG. 6 illustrates a fast forward in a speed double that of the normal speed. It is seen here that one picture in 2 is received with the associated time stamps. The first picture is therefore associated with a PTS of value value_1, whereas the second corresponds to the third picture of the programme played at normal speed and is associated with a PTS of value value_3 corresponding to the moment of presentation of this third picture if the stream was played at normal speed. It is seen, therefore, that here again a positioning based on the difference of the last PTS received with the PTS_Start still gives us the current relative time with respect to the start of the programme.

Figure 7:
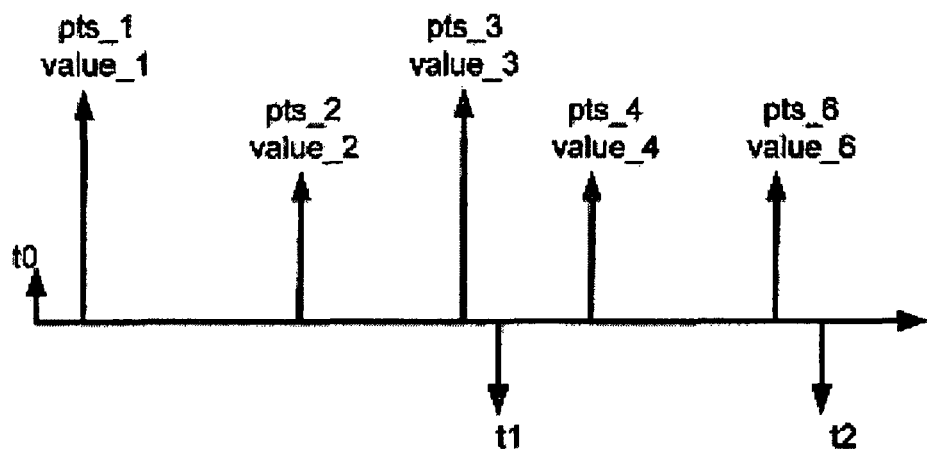
FIG. 7 shows a diagram of the pictures received and the PTSs associated during passage from a recovery at normal speed to fast forward.

FIG. 7 illustrates the case in which passage to double speed occurs during broadcast at time t1. Here again, whether one is between t0 and t1, during the broadcast at normal speed or between t1 and t2 during the broadcast at double speed, the same technique still gives a reliable current relative time in relation to the start of the programme.

Figure 8:
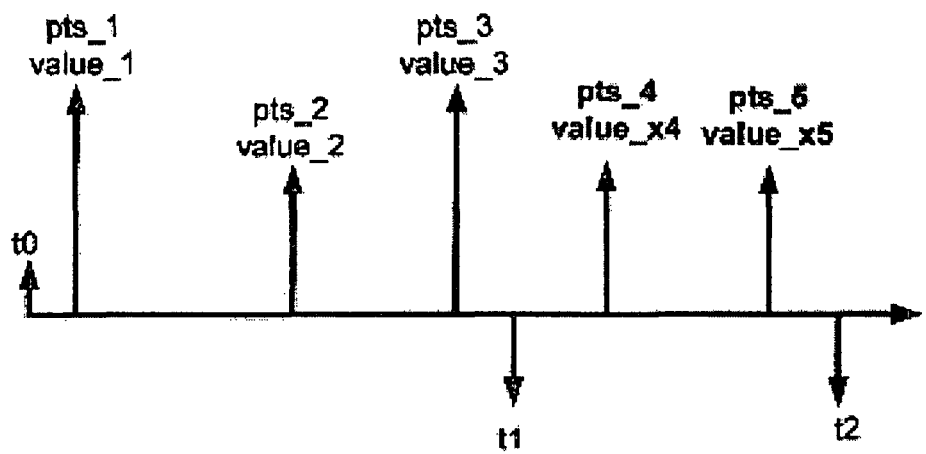
FIG. 8 shows a diagram of the pictures received and the non-interval associated PTS for a recovery at normal speed.

Unfortunately, it can be seen on the one hand that all the servers do not give the PTS range information when a "SETUP" command is acknowledged. Moreover, even in the case where the server does give this range, it turns out that the presentation time stamps contained in the flow received are sometimes calculated in a different time reference system from the reference system used to calculate the PTS_Start and PTS_End values communicated by the server. It also happens that the programme broadcast is an assembly of several sequences having been separately encoded. In this case, generally, each sequence has presentation time stamps calculated in its own time reference system. Reference system changes follow during the broadcast. This situation is described in FIG. 8, here the values called value__1, value__2 and value__3 correspond to a first sequence. A change of sequence occurs at time t1. The values called value_x4 and value_x5 correspond to a second sequence. Each sequence having been encoded in its own reference system, a break of sequence occurs between the two.

Figure 9:
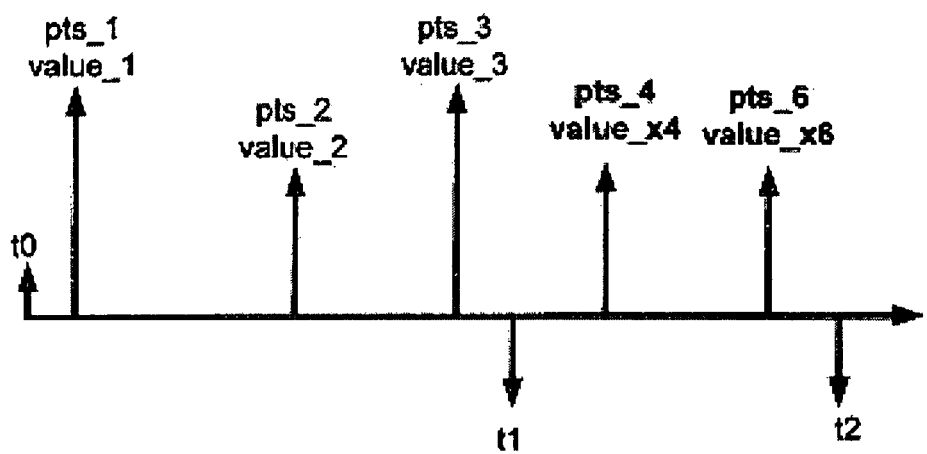
FIG. 9 shows a diagram of the pictures received and the PTSs associated during passage from a recovery at normal speed to fast forward with a change in interval.

Likewise, the servers can draw upon different versions of the programme to implement the particular recovery modes such as fast forward or rewind. In this case the server has a version of the programme for normal broadcast and a versions encoded at different speeds to respond to the requests of recovery at slow or accelerated speed. For example a different version containing on picture out of two will be used for broadcast at double speed. Here again, each version will generally have presentation time stamps calculated in a different time reference system. This situation is illustrated in FIG. 9. In this figure, a double speed fast recovery request occurs at time t1, the values of PTS value_x4 and value_x6 are in a different time differential of the values value__1, value__2 and value__3 of the stream broadcast at normal speed between t0 and t1.

One of the solutions to these problems with sequence breaks is the insertion of "NPT descriptor" as described in chapter 8 of the DSM-CC standard (ISO/IEC 13818-6). These descriptors are inserted in the stream at the moment the sequence breaks and indicates the correspondence between the presentation time stamps of the sequent and a logical reference system for the stream. But all the servers do not use this possibility.

Another manner of solving these problems consists in not using the time stamps received but in asking the server the value of the current relative time each time that it is required. A mechanism exists in RTSP to request parameters from the server in the form of a "GET_PARAMETER" command. In this case, before sending a command having to use a range argument such as the "PLAY" command the client asks, using the "GET_PARAMETER" command, the relative time current position of the stream. This method is generally functional but introduces a time corresponding to the sending of the command and the return of the result as well as the corresponding use of the bandwidth.

Figure 10:
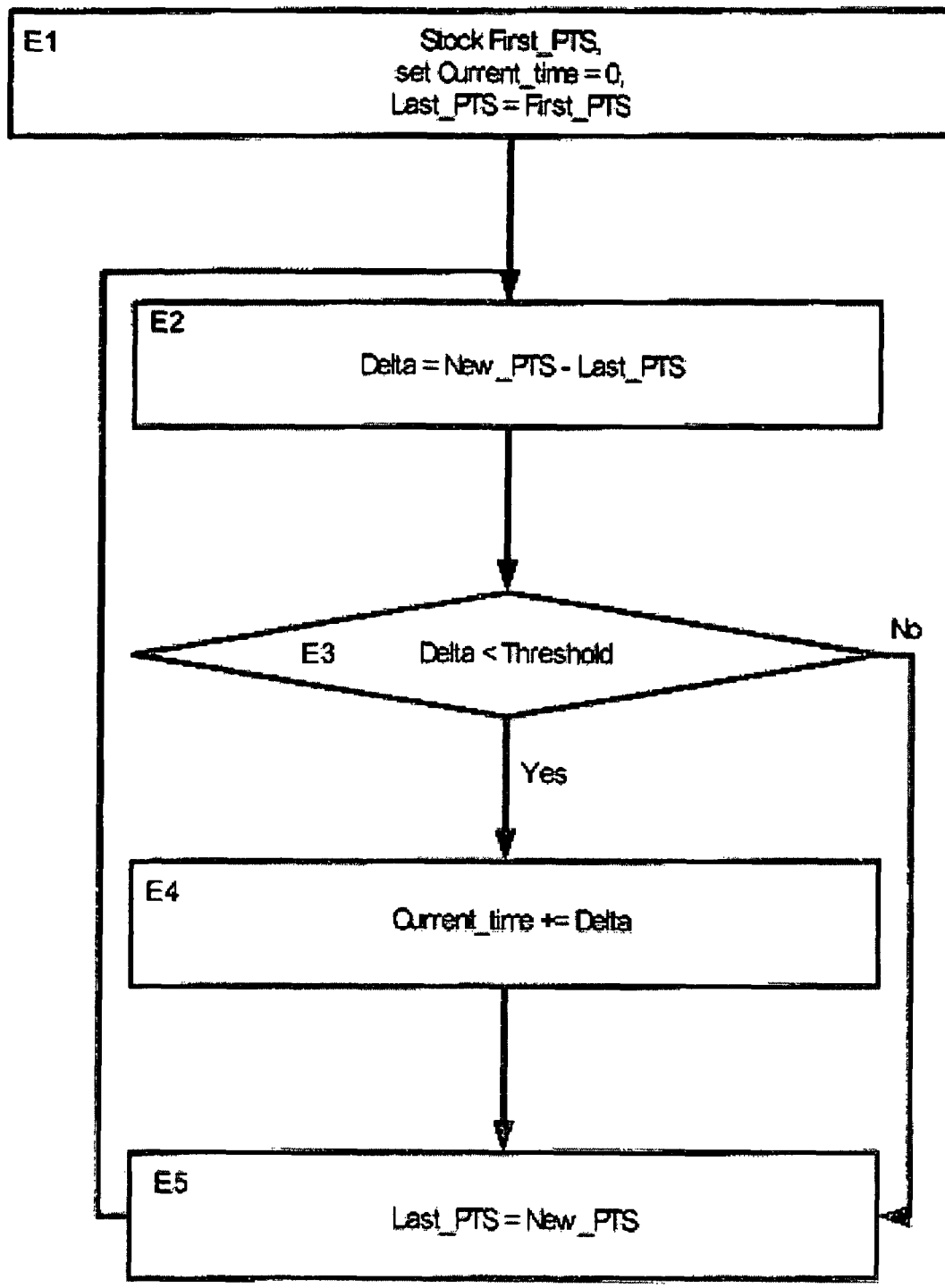
FIG. 10 shows a flow chart of the temporal identification method of the decoder.

We are now going to describe an example of a reliable method of local calculation of the current relative time position of the stream, not requiring the insertion of descriptors by the server nor the sending of a request to the server. This method also allows sequence breaks in the presentation time stamps to be dealt with. This method is illustrated in FIG. 10. It consists in maintaining a relative current value at the start of the programme and updating this value in accordance with the values of the time stamps received. This method is described in FIG. 10. During a first step E1, carried out at the start of the broadcast of the programme, the first PTS received is memorised in a First_PTS variable. A variable Current_time is set to 0. This variable will contain at all times the relative current time position in the programme. The Last_PTS variable is also set, corresponding to the value of the last PTS received, at the value of the first PTS.

Next, when a new PTS value is received in the stream, step E2 is carried out. This step consists in calculating the difference between this new PTS received and the previous one memorized in Last_PTS. This information is stored in a Delta variable.

With the aim of detecting the sequence breaks, the Delta value is compared with a threshold. Indeed, the presentation time stamps being associated with entities of the stream, typically video pictures, it is possible to determine the difference expected between two successive PTS received. This difference is typically the picture frequency expressed according to a 90 kHz clock. Naturally, the current recovery speed must be taken into account. It is therefore possible to determine a Threshold value, for example equal to twice the picture frequency, or the picture frequency multiplied by the maximum speed of the server plus a security coefficient. When the Delta value is greater than this threshold, it is considered that there is a sequence break. Otherwise, it is considered that there is no sequence break. In the absence of any sequence break, the stem E4 is carried out, consisting in accumulating the Delta value in the current time. In all cases, the value of the last PTS received is updated with the value of the new PTS in step E5. Next one loops back to step E2 on reception of a new presentation time stamp in the stream.

In this manner, the Current_time variable contains at any moment an accumulation of the differences between the time stamps belonging to the same sequence. No time is accumulated at the sequence break.

When the decoder must send a command to the server requiring a range of which one of the limits is the current time, it will use this value as the basis of the current time. The calculation of an NPT value in seconds is direct and corresponds to Current_time divided by the picture frequency.

In the particular recovery modes where the flow is not played at normal speed, namely the slow motion or accelerated speed modes, the method described makes the hypothesis that the presentation time stamps inserted into the stream are the time stamps calculated for a recovery at normal speed. Indeed, the difference between two PTS is considered as representing the time difference in the programme between the two corresponding entities during a recovery in normal mode. It turns out that some server, in order to comply with the MPEG standard, will generate new presentation time stamps in the modified speed recovery modes with respect to the normal speed. For example, in accelerated speed of a factor of 4, two successive pictures separated by 3 other pictures in the stream intended for normal mode will be assigned separate PTS values from the picture frequency in place of the PTS values calculated in the stream intended for normal mode and separated by 4 time the picture frequency. A variant of the method described consists in comparing, during a recovery at modified speed, the difference between two time stamp values with the picture frequency. If this difference is close to the picture frequency instead of being the product by the recovery speed, the delta will be multiplied by the speed before being accumulated with the current time.

The embodiment of the invention is based on the MPEG presentation time stamps as well as on the use of the RTSP protocol using ranges defined in the NPT form, but the invention can be generalised to other types of time stamps included in a flow of digital data as well as to other server command protocols and this irrespective of the time data coding method used by this protocol. The embodiment example is based on the broadcast of the stream on an IP network, but the invention can be extended to other types of networks.

The invention claimed is:

1. Method of local calculation in a receiver of a current relative temporal position of recovery within an audio/video program received by said receiver, wherein said method comprises at least the following steps:

initializing a stored current relative temporal position of recovery to zero;

reception of a digital audio/video data stream belonging to said audio/video program and comprising presentation time stamps;

upon reception of a new presentation time stamp in said digital audio/video data stream, calculating a difference, delta, between said new presentation time stamp in said digital audio/video data stream and a stored previously received presentation time stamp, and adding said delta to said stored current relative temporal position if said delta is not greater than a determined threshold value, said threshold value being dependent on a stream recovery speed, if said delta is greater than said determined threshold value, not performing said addition, being in the presence of a sequence discontinuity caused by time reference system changes in said digital audio/video data stream, and copying of said new presentation time stamp to storage used for storing said previously received presentation time stamp;

sending of an audio/video program broadcast control command from said receiver to a digital audio/video data stream server, said audio/video program broadcast control command containing a current relative temporal position of recovery of the audio/video program received by said receiver that is based on said stored current relative temporal position of recovery;

comparing, during a recovery by said receiver of said audio/video program at modified speed, said presentation time stamps in said digital audio/video data stream having been calculated for a recovery at normal speed, a difference between two presentation time stamps with a picture frequency of pictures in said digital data stream; and if said difference is close to said picture frequency instead of being a product of the recovery speed, multiplying said delta by said modified speed before said adding step.

2. Digital audio/video data stream receiver, said receiver comprising:

means for initializing a stored current relative temporal position of recovery to zero;

reception means for receiving of a digital audio/video data stream belonging to said audio/video program and comprising presentation time stamps, means for, upon reception of a new presentation time stamp in said digital audio/video data stream, calculating a difference, delta, between said new presentation time stamp in said digital audio/video data stream and a stored previously received presentation time stamp, and adding said delta to said stored current relative temporal position if said delta is not greater than a determined threshold value, said threshold value being dependent on a stream recovery speed, if said delta is greater than said determined threshold value, not performing said addition, being in the presence of a sequence discontinuity caused by time reference system changes in said digital audio/video data stream, and copying of said new presentation time stamp to storage used for storing said previously received presentation time stamp;

means for sending of an audio/video program broadcast control command from said receiver to a digital audio/video data stream server, said audio/video program broadcast control command containing a current relative temporal position of recovery of the audio/video program received by said receiver that is based on said stored current relative temporal position of recovery;

means for comparing, during a recovery by said receiver of said audio/video program at modified speed, said presentation time stamps in said digital audio/video data stream having been calculated for a recovery at normal speed, a difference between two presentation time stamps with a picture frequency of pictures in said digital data stream; and if said difference is close to said picture frequency instead of being a product of the recovery speed, multiplying said delta by said modified speed before said adding step.

3. Method according to claim 1, wherein said determined threshold value is determined through multiplication of a picture frequency of pictures in said digital audio/video data stream with a server maximum speed plus a security coefficient.

4. Digital audio/video data stream receiver according to claim 2, wherein said receiver further comprises means to determine said threshold value through multiplication of a picture frequency of pictures in said digital audio/video data stream with a server maximum speed plus a security coefficient.

\* \* \* \* \*